US007565038B2

(12) United States Patent
Earnshaw (10) Patent No.: US 7,565,038 B2
(45) Date of Patent: Jul. 21, 2009

(54) THERMO-OPTIC WAVEGUIDE APPARATUS (75) Inventor: Mark P. Earnshaw, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/700,534

(22) Filed: Jan. 31, 2007

(65) Prior Publication Data

US 2008/0181550 A1    Jul. 31, 2008

(51) Int. Cl.
    *G02F 1/01*    (2006.01)
(52) U.S. Cl. ......................................................... 385/1
(58) Field of Classification Search .................. None
    See application file for complete search history.

(56) References Cited

U.S. PATENT DOCUMENTS

| 4,781,424 | A | * | 11/1988 | Kawachi et al. | ............. 385/132 |
| 6,031,957 | A | | 2/2000 | Suzuki et al. | |
| 6,415,066 | B1 | * | 7/2002 | Harpin et al. | ................. 385/14 |
| 6,847,750 | B1 | * | 1/2005 | Baumann et al. | .............. 385/16 |
| 2005/0169566 | A1 | * | 8/2005 | Takahashi | ...................... 385/1 |

FOREIGN PATENT DOCUMENTS

| JP | 03006504 | 1/1991 |
| JP | 2001222034 | 8/2001 |

OTHER PUBLICATIONS

Sugita et al., "Bridge-Suspended Silica-Waveguide Thermo-Optic Phase Shifter and Its Application to Mach-Zehnder Type Optical Switch", *The Transactions Of The IECE*, vol. E 73, No. 1, pp. 105-109 (Jan. 1990).
Inoue et al., "Polarization Sensitivity of a Silica Waveguide Thermooptic Phase Shifter for Planar Lightwave Circuits", *IEEE Photonics Technology Letters*, vol. 4, No. 1, pp. 36-38 (Jan. 1992).
Doerr et al., "Eight-Wavelength Add-Drop Filter with True Reconfigurability", *IEEE Photonics Technology Letters*, vol. 15, No. 1, pp. 138-140 (Jan. 2003).
Offrein et al., "Polarization-Independent Thermooptic Phase Shifters in Silicon-Oxynitride Waveguides", *IEEE Photonics Technology Letters*, vol. 16, No. 6, pp. 1483-1485 (Jun. 2004).
Earnshaw et al., "Ultra-low power thermo-optic silica-on-silicon waveguide membrane switch", *Electronics Letters*, vol. 43, No. 7, 2 pgs (Mar. 29, 2007).

* cited by examiner

*Primary Examiner*—Sung H Pak
*Assistant Examiner*—Mike Stahl (57) ABSTRACT

Apparatus including a waveguide segment having a cladding that surrounds an optically-transmissive core extending along a path; a heater in thermal communication with the waveguide segment along at least a part of the path; a thermally-conductive substrate; a thermally-conductive base in fixed alignment with the waveguide segment and the thermally-conductive substrate, the thermally-conductive base being discontinuously on the waveguide segment along the path; and a rib in fixed alignment with the waveguide segment and the thermally-conductive substrate, the rib transversely extending in a direction away from the waveguide segment at a point along the path. Process utilizing apparatus for generating a phase shift in light.

11 Claims, 6 Drawing Sheets

THERMO-OPTIC WAVEGUIDE APPARATUS

BACKGROUND OF THE INVENTION

1. Field of the Invention

This invention relates generally to thermo-optic waveguide apparatus.

2. Related Art

Thermo-optic waveguide apparatus utilize heat to change the refractive index of an optically-transmissive structure, causing an optical path length for a source of light propagating through the structure to be increased. This optical path length change in turn causes a phase of the light propagating in the optically-transmissive structure to be changed. Such light propagating through the structure can then be combined with a source of light propagating elsewhere. Constructive and destructive interference between two such combined sources of light can be utilized as an optical on/off or dimmer switch, or as a tuner of an output wavelength. For example; a Mach-Zehnder thermo-optic interferometer apparatus may be formed based on these principles.

There is a continuing need for new types of thermo-optic waveguide apparatus designed for effective operation utilizing these thermo-optic principles.

SUMMARY

In an implementation of an example, an apparatus is provided, including a waveguide segment having a cladding that surrounds an optically-transmissive core extending along a path; a heater in thermal communication with the waveguide segment along at least a part of the path; a thermally-conductive substrate; and a thermally-conductive base in fixed alignment with the waveguide segment and the thermally-conductive substrate. The thermally-conductive base is discontinuously on the waveguide segment along the path. The apparatus also includes a rib in fixed alignment with the waveguide segment and the thermally-conductive substrate. The rib transversely extends in a direction away from the waveguide segment at a point along the path.

In a further implementation of an example, a process is provided for generating a phase shift in light, including providing an apparatus. The apparatus includes a first waveguide segment having a cladding that surrounds an optically-transmissive core extending along a first path—a heater being in thermal communication with the first waveguide segment along at least a part of the first path; a second waveguide segment having a cladding that surrounds an optically-transmissive core extending along a second path; an output waveguide in optical communication with the first and second waveguide segments; a thermally-conductive substrate; and a thermally-conductive base in fixed alignment with the first and second waveguide segments and the thermally-conductive substrate. The thermally-conductive base is discontinuously on the waveguide segments along each of the first and second paths. The apparatus also includes a rib in fixed alignment with the first and second waveguide segments and the thermally-conductive substrate. The rib transversely extends in a direction away from the first waveguide segment at a point along the first path and away from the second waveguide segment at a point along the second path. The process also includes passing light through the first and second waveguide segments and utilizing the heater to increase a temperature of at least a part of the first waveguide segment; combining light from the first and second waveguide segments at the output waveguide; and allowing heat to be dissipated from the first waveguide segment through the thermally-conductive base into the thermally-conductive substrate.

As another implementation of an example, a process is provided for generating a phase shift in light, including providing an apparatus. The apparatus includes a first waveguide segment having a cladding that surrounds an optically-transmissive core extending along a first path—a heater being in thermal communication with the first waveguide segment along at least a part of the first path; a second waveguide segment having a cladding that surrounds an optically-transmissive core extending along a second path spaced apart from the first path; an output waveguide in optical communication with the first and second waveguide segments; a thermally-conductive substrate; and a thermally-conductive base in fixed alignment with the first and second waveguide segments and the thermally-conductive substrate. The thermally-conductive base is discontinuously on the waveguide segments along each of the first and second paths. The apparatus includes a first rib in fixed alignment with the first waveguide segment and the thermally-conductive substrate. The first rib transversely extends in a direction away from the first waveguide segment at a point along the first path. The apparatus includes a second rib in fixed alignment with the second waveguide segment and the thermally-conductive substrate. The second rib transversely extends in a direction away from the second waveguide segment at a point along the second path. The process also includes passing light through the first and second waveguide segments and utilizing the heater to increase a temperature of at least a part of the first waveguide segment; combining light from the first and second waveguide segments at the output waveguide; and allowing heat to be dissipated from the first waveguide segment through the thermally-conductive base into the thermally-conductive substrate.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Cycling of a thermo-optic waveguide apparatus, such as repeated conversion from an on state, to an off state, and then back to an on state, requires repeated application and dissipation of heat. A short cycle time may be useful in end-use applications for thermo-optic waveguide apparatus where high-speed operation is needed. For example, switching time for a thermo-optic waveguide apparatus utilized as an on/off switch may need to be minimized. However, rapid cycling of the heat application and heat dissipation processes are needed if a short cycle time is selected. Rapid heating of a thermo-optic waveguide apparatus may be facilitated by reducing a volume of material to be heated. Rapid heat dissipation from a thermo-optic waveguide apparatus may be facilitated by providing effective pathways in the apparatus for conducting heat away from the waveguide. Rapid cycling of the heat application and heat dissipation processes in an array of thermo-optic waveguide apparatus such as an arrayed waveguide grating filter may, as another example, be needed.

An apparatus is provided, including a waveguide segment having a cladding that surrounds an optically-transmissive core extending along a path, the apparatus also including a thermally-conductive substrate. A heater is in thermal communication with the waveguide segment along at least a part of the path. The apparatus further includes a thermally-conductive base in fixed alignment with the waveguide segment and the thermally-conductive substrate, the thermally-conductive base being discontinuously on the waveguide segment along the path. A rib is also in fixed alignment with the waveguide segment and the thermally-conductive substrate. The rib transversely extends in a direction away from the waveguide segment at a point along the path. The apparatus may, for example, include two heaters each in thermal communication with the waveguide segment along a different part of the path, the heaters being separated by a gap at a location along the path. The apparatus may, as another example, include a second waveguide segment having a cladding that surrounds an optically-transmissive core extending along a second path different than the first path, the rib being in fixed alignment with and transversely extending in a direction away from the second waveguide segment at a point along the second path.

A process for generating a phase shift in light is also provided. The process includes providing an apparatus as described in the preceding paragraph including a second waveguide segment. Light is passed through the first and second waveguide segments, and the heater is utilized to increase a temperature of at least a part of at least one of the first and second waveguide segments. Light from the first and second waveguide segments is combined together at an output waveguide. Heat is dissipated from at least one of the first and second waveguide segments through the thermally-conductive base into the thermally-conductive substrate. The process may, for example, include providing an apparatus in which a part of the thermally-conductive base is on the first or second waveguide segment at the point along the path where the rib transversely extends away from the first or second waveguide segment; and allowing heat to be dissipated through the rib into the thermally-conductive substrate. The process may, as another example, include providing an apparatus having two heaters respectively in thermal communication with first and second parts of the first or second waveguide segment that are separated by a gap at a location of the first or second waveguide segment along the first or second path; and heating the first and second parts of the first or second waveguide segment to a higher temperature than a temperature of the first or second waveguide segment at the location.

Figure 1:
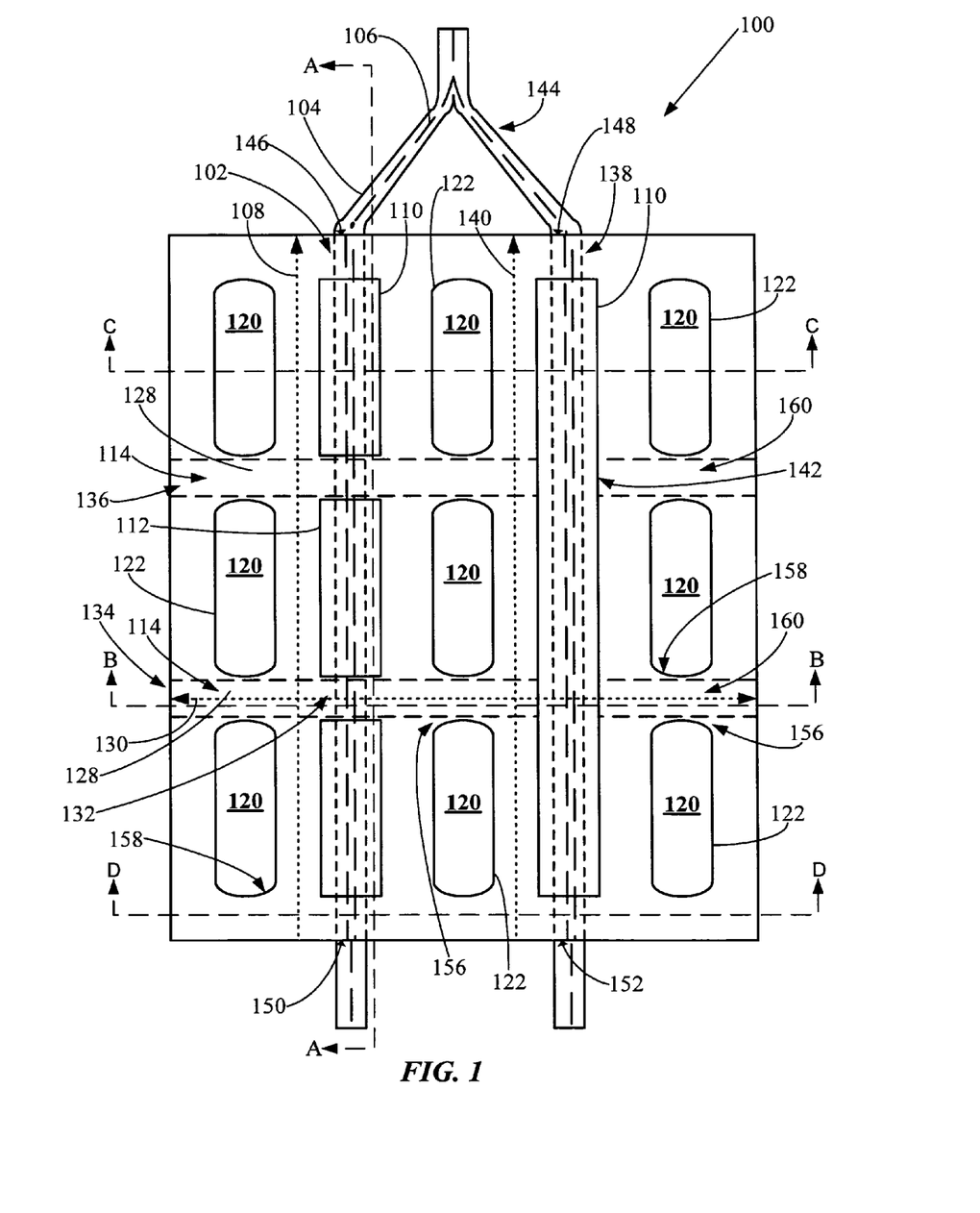
FIG. 1 is a top view showing an example of an implementation of an apparatus including a waveguide segment having a cladding that surrounds an optically-transmissive core extending along a path.

FIG. 1 is a top view showing an example of an implementation of an apparatus 100, including a waveguide segment 102 having a cladding 104 that surrounds an optically-transmissive core 106 extending along a path represented by an arrow 108. A heater 110 is in thermal communication with the waveguide segment 102. As an example, the heater 110 may include a plurality of section heaters 112 spaced apart with interposed gaps 114 along the path represented by the arrow 108. Each of the section heaters 112 may be positioned to apply heat to part of the waveguide segment 102 along the path represented by the arrow 108. As an example, a plurality of section heaters 112 may be electrically connected together by conductors (not shown) passing above and bridging the gaps 114, the section heaters 112 further forming part of an electrical circuit (not shown) for powering the section heaters 112.

Figure 2:
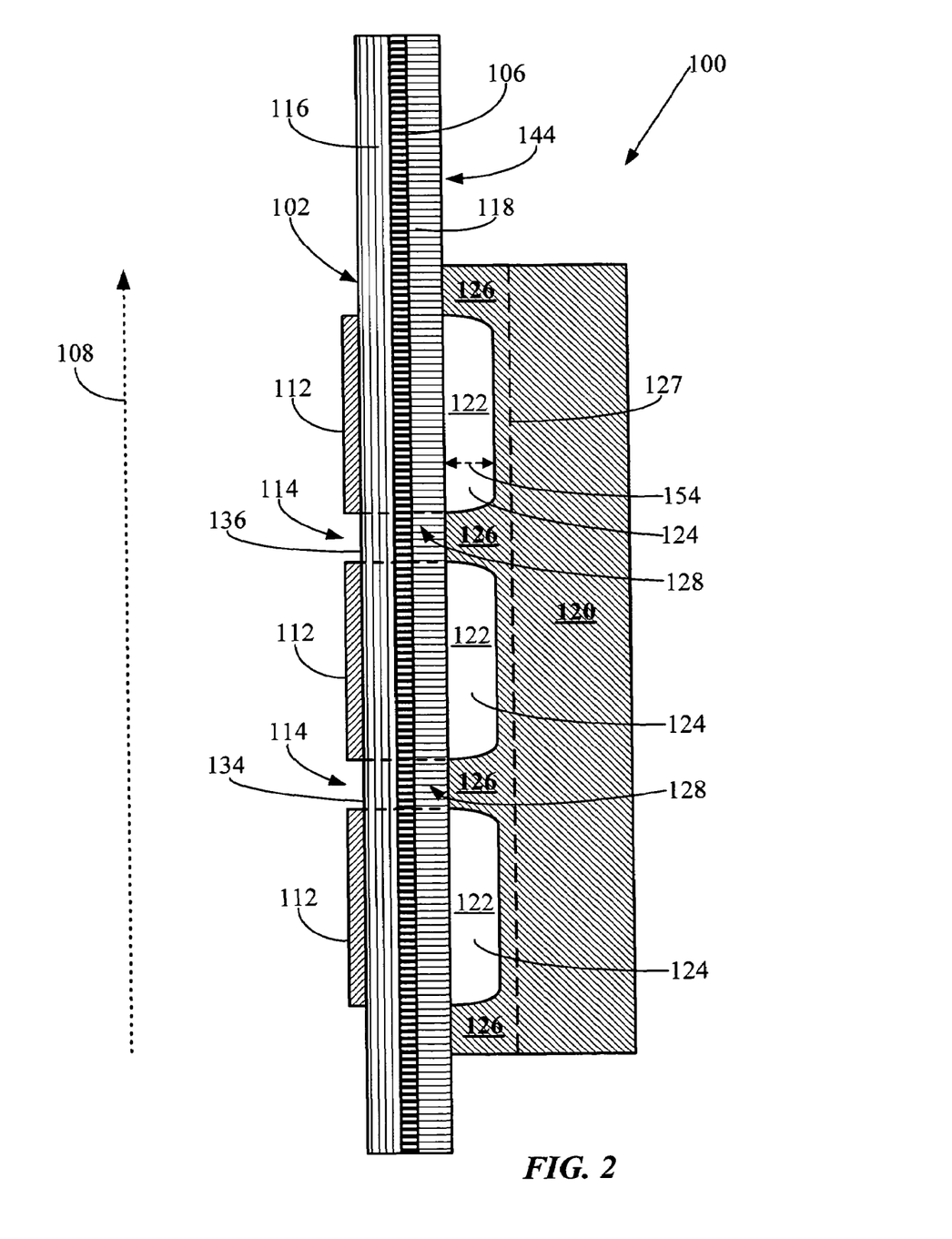
FIG. 2 is a side cross-sectional view, taken along the direction of the arrow A-A, of the apparatus shown in FIG. 1.

FIG. 2 is a side cross-sectional view, taken along the direction of the arrow A-A, of the apparatus 100 shown in FIG. 1. The waveguide segment 102 may include, for example, an upper cladding 116 and a lower cladding 118 surrounding the optically-transmissive core 106. As an example, the upper and lower claddings 116, 118 may together be monolithic. The apparatus 100 includes a thermally-conductive substrate 120. Cutouts 122 leaving airspace 124 reaching down to the thermally-conductive substrate 120 may laterally separate parts of the waveguide segment 102 along the path represented by the arrow 108. The apparatus 100 further includes a thermally-conductive base 126 in fixed alignment with the waveguide segment 102 and the thermally-conductive substrate 120, the thermally-conductive base 126 being discontinuously on the waveguide segment 102 along the path represented by the arrow 108. As an example, the thermally-conductive substrate 120 and the thermally-conductive base 126 may together be monolithic, and an interface between them as indicated by a dotted line 127 may be omitted. As another example, the thermally-conductive base 126 may support weight of and structurally immobilize the waveguide segment 102 on the thermally-conductive substrate 120.

Figure 3:
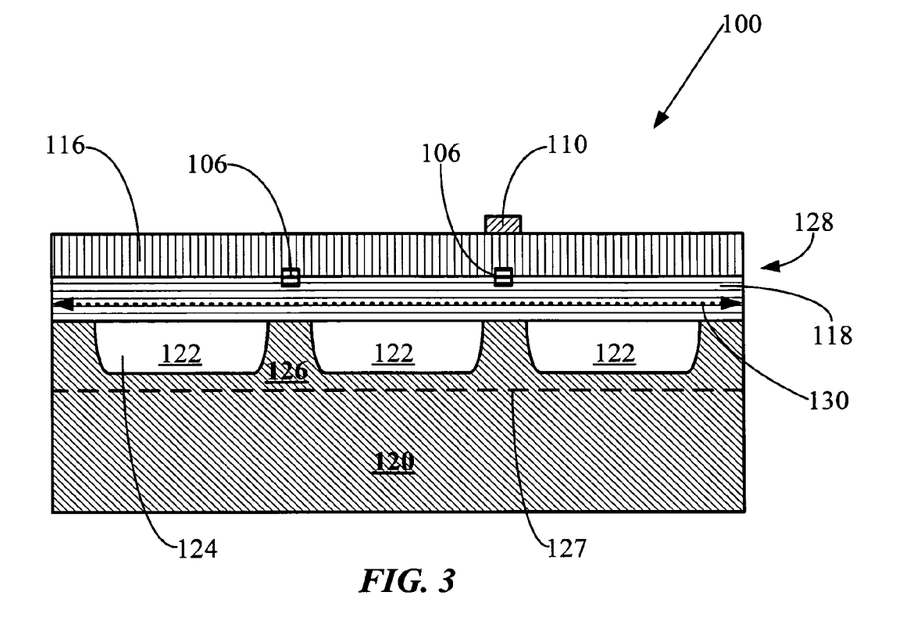
FIG. 3 is a side cross-sectional view, taken along the direction of the arrow B-B, of the apparatus shown in FIG. 1.

FIG. 3 is a side cross-sectional view, taken along the direction of the arrow B-B, of the apparatus 100 shown in FIG. 1. The apparatus 100 includes a rib 128 in fixed alignment with the waveguide segment 102 and the thermally-conductive substrate 120. As an example, the rib 128 may be monolithic together with the lower cladding 118. In further examples, the rib 128 may be monolithic together with the upper cladding 116 or with the cladding 104. The rib 128 may, for example, transversely extend in the directions of an arrow 130, away from the waveguide segment 102 at a point 132 along the path represented by the arrow 108. The rib 128 may, as an example, be aligned with a part of the thermally-conductive base 126 along the path represented by the arrow 108 that is on both the thermally-conductive substrate 120 and the lower cladding 118, so that the thermally-conductive base 126 and the rib 128 may together immobilize and support weight of the waveguide segment 102. In a further example, the rib 128 may transversely extend for the distances represented by the endpoints of the arrow 130 away from the waveguide segment 102, and a part of the thermally-conductive base 126 interposed between the rib 128 and the thermally-conductive substrate 120 may be discontinuously on the waveguide segment 102 over the distances away from the waveguide segment 102 represented by the endpoints of the arrow 130. FIG. 3 shows, for example, that airspace 124 may be interposed between parts of the thermally-conductive base 126 discontinuously on the waveguide segment 102 over the distances represented by the endpoints of the arrow 130. The rib 128 may, for example, be aligned with a gap 114. In addition, the apparatus 100 may include a plurality of section heaters 112 interposed between gaps 114. Further, a part of the thermally-conductive base 126 may be on the thermally-conductive substrate 120 and on the waveguide segment 102 at a location 134 of the gap 114 along the path represented by the arrow 108. Inclusion in the apparatus 100, at a location 134, of the rib 128 and a part of the thermally-conductive base 126 that is on both the thermally-conductive substrate 120 and on the waveguide segment 102, may be selected because pathways for dissipation of heat from the waveguide segment 102 through the rib 128 and through that part of the thermally-conductive base 126 into the thermally-conductive substrate 120 may be relatively long. In that case, a power requirement for heating the waveguide segment 102 in operation of the apparatus 100 may be relatively reduced. As another example, a rib 128 may be in fixed alignment with the waveguide segment 102 and the thermally-conductive substrate 120 at a location 136 of the gap 114, in the same manner as discussed with respect to the rib 128 at the location 134.

Figure 4:
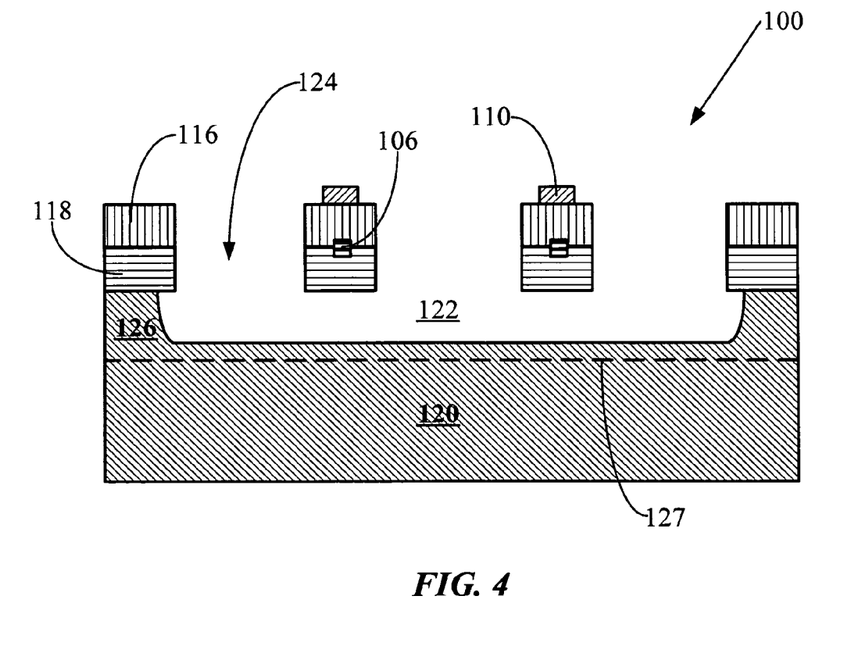
FIG. 4 is an additional side cross-sectional view, taken along the direction of the arrow C-C, of the apparatus 100 shown in FIG. 1.

FIG. 4 is an additional side cross-sectional view, taken along the direction of the arrow C-C, of the apparatus 100 shown in FIG. 1. As an example, the cutouts 122 may leave airspace 124 interposed between the thermally-conductive substrate 120 and the upper and lower claddings 116, 118. FIG. 1 shows that the line C-C is taken along cutouts 122 midway in the direction of the path represented by the arrow 108. As an example, the thermally-conductive base 126 may not be on the waveguide segment 102 midway along cutouts 122. In addition, for example, there may be no rib 128 midway along cutouts 122, in the direction of the arrow 108. Accordingly, for example, the waveguide segment 102 may be surrounded by airspace 124 where the line C-C is taken in FIG. 1.

Figure 5:
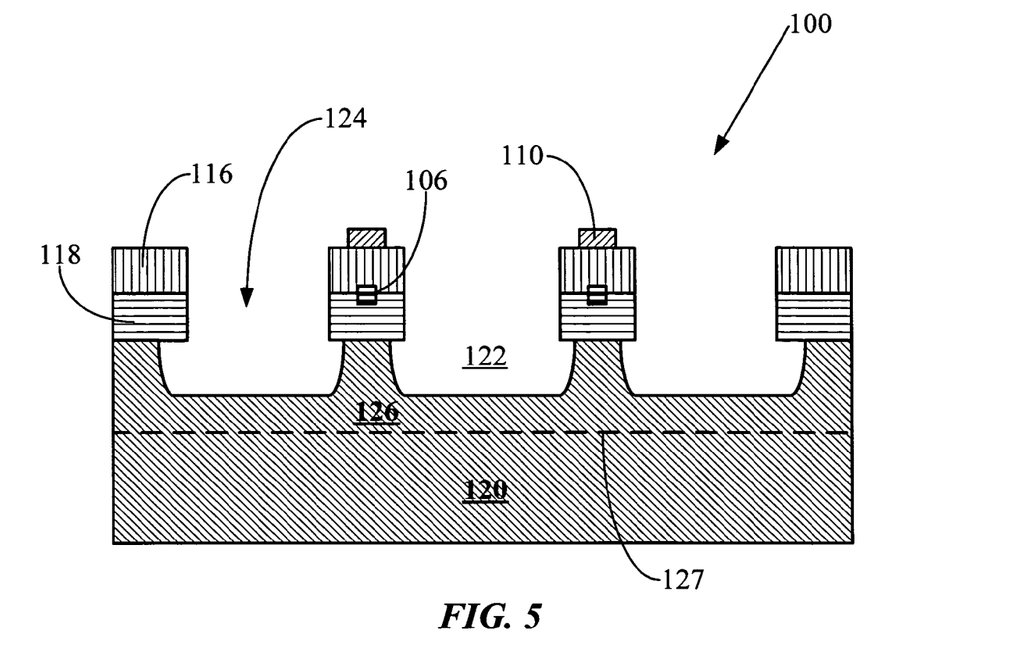
FIG. 5 is a side cross-sectional view, also taken along the direction of the arrow C-C, of an example of a modification of the apparatus 100 shown in FIG. 1.

FIG. 5 is a side cross-sectional view, also taken along the direction of the arrow C-C, of an example of a modification of the apparatus 100 shown in FIG. 1. A part of the thermally-conductive base 126 may, for example, be on the thermally-conductive substrate 120 and on the waveguide segment 102 midway along a cutout 122.

Figure 6:
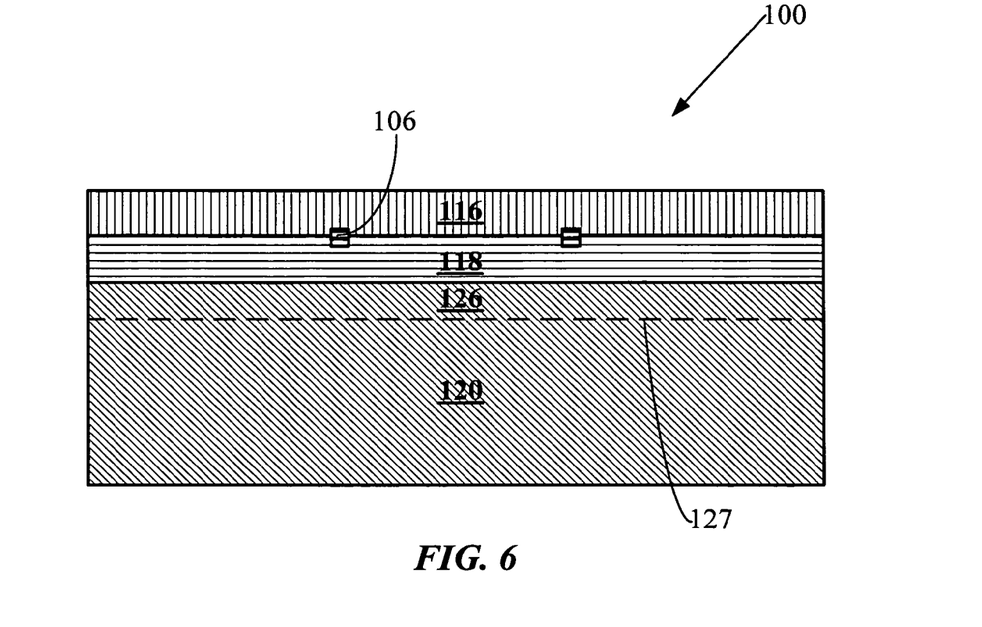
FIG. 6 is another side cross-sectional view, taken along the direction of the arrow D-D, of the apparatus shown in FIG. 1.

FIG. 6 is another side cross-sectional view, taken along the direction of the arrow D-D, of the apparatus 100 shown in FIG. 1. FIG. 6 shows the examples, discussed above, of the waveguide segment 102 including the upper cladding 116, lower cladding 118, optically-transmissive core 106, and thermally-conductive substrate 120.

Referring again to FIG. 1, the apparatus 100 may, as an example, include a second waveguide segment 138. In this example, the waveguide segment 102 may be referred to as a first waveguide segment 102, and the path along which the optically-transmissive core 106 of the first waveguide segment 102 extends as represented by the arrow 108 may be referred to as a first path. The apparatus 100 may accordingly further include, in this example, a second waveguide segment 138 having a cladding 104 that surrounds an optically-transmissive core 106 extending along a second path different than the first path, represented by an arrow 140. As an example, the first and second paths respectively represented by the arrows 108, 140 may be parallel. It is understood by those skilled in the art that in another example, the first and second paths respectively represented by the arrows 108, 140 may not be parallel. In this example, the apparatus 100 may additionally include a thermally-conductive base 126 in fixed alignment with the second waveguide segment 138 and the thermally-conductive substrate 120, the thermally-conductive base 126 being discontinuously on the second waveguide segment 138 along the second path represented by the arrow 140. The rib 128, according to this example, may be in fixed alignment with the second waveguide segment 138 and the thermally-conductive substrate 120, the rib 128 transversely extending in the directions of the arrow 130 away from the second waveguide segment 138 at a point 142 along the second path represented by the arrow 140. In this example, a heater 110 may be in thermal communication with the second waveguide segment 138 along at least a part of the second path represented by the arrow 140. For example, the heater 110 in thermal communication with the second waveguide segment 138 may extend along all or substantially all, of the second path represented by the arrow 140. As another example (not shown), the heater 110 may include a plurality of section heaters 112 spaced apart with interposed gaps 114 along the path represented by the arrow 140. In that case, each of the section heaters 112 may be positioned to apply heat to a part of the waveguide segment 138 along the path represented by the arrow 140.

The apparatus 100 may, as another example, include an output waveguide 144 in optical communication with an end 146 of the first waveguide segment 102 and with an end 148 of the second waveguide segment 138. For example, the output waveguide 144 may be a 2×1 optical coupler. In another example, the apparatus 100 may include another 2×1 optical coupler (not shown) in optical communication with an end 150 of the first waveguide segment 102 and with an end 152 of the second waveguide segment 138.

A part of the thermally-conductive base 126 on the first or second waveguide segments 102, 138 may take various shapes. For example, such a part of the thermally-conductive base 126 may be shaped as a post spanning a distance represented by an arrow 154 between the thermally-conductive substrate 120 and the first or second waveguide segment 102, 138 as shown in FIG. 2. As examples, such a post may have a regular or irregular cross-sectional shape defined transversely to the distance represented by the arrow 154, such a shape being square or round as examples and being uniform or variable along the distance represented by the arrow 154. In an example, such a cross-sectional square shape as may be selected may have a cross-sectional area within a range of between about two (2) square microns and about fifty (50) square microns. As further examples (not shown), a part of the thermally-conductive base 126 spanning the distance represented by the arrow 154 between the thermally-conductive substrate 120 and the first or second waveguide segment 102, 138 may be shaped as a rib elongated in a direction of the arrow 130, the arrow 108, or the arrow 140.

Cutouts 122 leaving airspace 124 in the apparatus form intersections 156 between the first and second waveguide segments 102, 138 and other parts of the upper and lower claddings 116, 118. In an example, the intersections 156 may include rounded corners 158 formed in the upper and lower claddings 116, 118. The rounded corners 158 may make a slow radial transition between the first and second waveguide segments 102, 138 and other parts of the upper and lower claddings 116, 118. Such rounded corners may, for example, strengthen the intersections 156 to resist cracking and breakage of the apparatus 100 due to internal stresses.

The dimensions of the elements 102-158 of the apparatus 100 discussed above may be selected depending on a particular end-use application, taking into account, for example, balancing a power consumption of the apparatus 100 with a cycle time for heat application/allowing heat to dissipate from a waveguide segment 102, 138. The power consumption of an apparatus 100 depends, for example, on the thermal properties and volume of the material that needs to be heated to generate a π phase change in light passing through the waveguide segment 102, 138. When a first source of light subjected to such a π phase change is combined with a second source of light, for example, the combined light output may be reduced from a maximum light transmission to an absence of light transmission. Features of an apparatus 100 that may reduce a volume of material that needs to be so heated to generate a π phase change in light include: parts of the thermally-conductive base 126 being discontinuously on the waveguide segments 102, 138, the location of such parts of the thermally-conductive base 126 at gaps 114, the location of ribs 128 at gaps 114, and including cutouts 122. The cycle time for heat application/allowing heat to dissipate from a waveguide segment 102, 138 depends, for example, on the efficiency of pathways available to conduct the heat away from the apparatus 100. As an example, including discontinuous pathways along the waveguide segments 102, 138 passing through the thermally-conductive base 126 and the thermally-conductive substrate 120 may provide dissipation of heat from the waveguide segments 102, 138 resulting in a relatively fast cycle time. Structural integrity of the apparatus 100 is an additional consideration. For example, inclusion in an apparatus 100 of a thermally-conductive base 126 and a rib 128 each being in fixed alignment with a waveguide segment 102, 138 and with the thermally-conductive substrate 120 may reduce incidence of structural failure of the apparatus 100. As a further consideration, thicknesses of the upper and lower claddings 116, 118 sufficient to confine light to the optically-transmissive core 106 may be selected to facilitate light transmission through the apparatus 100.

The thermally-transmissive substrate 120 may, for example, have a thickness adequate to provide structural strength to the apparatus 100 and may minimize any excess material that would add to the solid volume of the apparatus 100 without a significant performance benefit. As an example, the thickness of the thermally-transmissive substrate 120 may be within a range of between about 100 microns and about 1 millimeter. The upper and lower claddings 116, 118 may, for example, have heights and widths defined in directions transverse to the path represented by the arrow 108 that are adequate to confine light propagating in the optically-transmissive core 106. As an example, each of the upper and lower claddings 116, 118 may have such heights and widths each being within a range of about 1 micron and about 40 microns, or being about 10 microns and about 15 microns respectively. As an example, the thermally-conductive substrate 120 may be formed of a composition having a higher refractive index than that of a material of which the lower cladding 118 may be formed. In that example, the lower cladding 118 may have slightly larger dimensions than the upper cladding 116 to reduce leakage of light from the lower cladding 118 into the thermally-conductive substrate 120. The optically-transmissive core 106 may have height and width dimensions defined in directions transverse to the path represented by the arrow 108 adequate for propagation of light, each such dimension being within a range of between about one (1) micron and about ten (10) microns for example. A length of the heater 110 represented by the endpoints of the arrow 108 may be selected to be adequate for generating a phase change in light propagating in the waveguide segments 102, 138, such as a length within a range of between about 1 millimeter and about 5 millimeters for example. A length for a heater 110 of about 2.840 millimeters may be utilized, for example. A length of the heater 110 or the combined length of a plurality of section heaters 112 may also take into account a resulting temperature increase that may be induced in the waveguide segments 102, 138, and the effect of the electrical resistance of the heaters 110, 112 on operation of an external circuit (not shown) for powering the heaters 110, 112. A width of the heaters 110, 112 transverse to the path represented by the arrow 108 may be selected for compatibility with dimensions of the waveguide segments 102, 138, such as a width within a range of between about 5 microns and about 50 microns for example. A thickness of the heaters 110, 112 on the waveguide segments 102, 138 may be a minimal thickness needed for conducting power, such as about 2,000 angstroms for example.

Lengths of the cutouts 122 in the direction of the arrow 108 may be selected to divide the length of the apparatus 100 in the same direction into sections defined by the cutouts 122, interposed by transverse regions 160. As an example, ribs 128 may be located at the transverse regions 160. For example, such lengths of the cutouts 122, which may be uniform or non-uniform, may be within a range of between about 200 microns and about 1 millimeter, such as 208 microns, 406 microns, or 645 microns as examples. The formula $\Gamma_L = NL_E/L_S$ may be utilized as an expression of the effective fractional isolation length $\Gamma_L$ of an apparatus 100 having N sections, cutout lengths $L_E$, and a total length $L_S$ of the wavelength segments 102, 138. The power required in operating an apparatus 100 to induce a π phase change in light may exponentially decrease as the effective fractional isolation length $\Gamma_L$ is increased. As an example, an apparatus 100 formed of chromium/silica/silicon materials may have a structure selected so that $\Gamma_L$ is within a range of between about 0.74 and about 0.91. A depolarized switching power for an apparatus 100 having $\Gamma_L = 0.91$ may be about 23 milliwatts. A response time for such an apparatus 100 expressed as a 90%-10% falltime may be about 20 milliseconds. Corresponding depolarized switching power/response times for an apparatus 100 having $\Gamma_L = 0.74$ or 0.85 may respectively be 65 milliwatts/7 milliseconds and 35 milliwatts/13 milliseconds. Dynamic birefringence in such an apparatus 100 may be only about 4%, because silica glass may be free to laterally expand in the cutouts 122 in the directions of the arrow 130. As a result, polarization dependent loss may be correspondingly reduced. An apparatus 100 may be designed, for example, to have a non-zero static phase error to facilitate driving the apparatus 100 to optimum on/off points utilizing only a single waveguide segment 102, 138 including a heater 110. As an example, a design value for the static phase error of about 20° may be utilized.

Widths of the cutouts 122 in the directions of the arrow 130 may be as large as possible laterally adjacent to the waveguide segments 102, 138 to minimize lateral pathways in the directions of the arrow 130 for heat dissipation through the upper and lower claddings 116, 118, such as within a range of between about 50 microns and about 150 microns for example. Depths of the cutouts 122 in the directions of the arrow 154 may, for example, be sufficient to penetrate through both the upper and lower claddings 116, 118 and partially into the thermally-conductive substrate 120. For example, the depths of the cutouts 122 may penetrate up to about 35 microns into the thermally-conductive substrate 120. Thicknesses of the ribs 128 in the direction represented by the arrow 108 may be sufficient for the ribs 128 to provide adequate structural strength to the apparatus 100. For example, such thicknesses of the ribs 128 may each independently be within a range of between about 50 microns and about 100 microns, or within a range of between about 80 microns and about 100 microns. A minimum distance between the waveguide segments 102, 138 in the directions of the arrow 130 may be sufficient to result in a tolerably low level of thermal and optical cross-talk between them, such as a distance within a range of between about 50 microns and about 150 microns for example.

It is understood that the apparatus 100 may be fabricated from doped and undoped silicon dioxide and silicon or from other conventional materials known to those skilled in the art. Where silicon dioxide and silicon materials are utilized, as an example, the heat conductivity of the silicon material may be substantially higher than that of the silicon dioxide materials. Selection of the discontinuous locations in the direction of the arrow 108 as shown in FIG. 2 where the thermally-conductive base is on the waveguide segments 102, 138 may take into account such heat conductivities.

A process for fabrication of the apparatus 100 may utilize techniques for depositing and etching the selected materials as known to those skilled in the art. For example, layers of silicon dioxide and silicon materials may be deposited by flame hydrolysis or chemical vapor deposition, and chromium heaters 110, 112 may be deposited by electron beam evaporation. Cutouts 122 may be formed by anisotropic etching followed by isotropic etching. For example, reactive ion etching of a silicon dioxide material, such as an inductively-coupled plasma etch, may anisotropically etch the silicon dioxide material at locations for the cutouts 122, selectively stopping at a thermally-conductive substrate 120 formed of a silicon material. A dry etch process may then isotropically etch transversely and partially downward into the thermally-conductive substrate 120. For example, the transverse dry etching may be allowed to extend in all directions for a distance of about 40 microns.

In an example of operation of the apparatus 100 shown in FIGS. 1-6, section heaters 112 in thermal communication with the waveguide segment 102 and spaced apart by interposed gaps 114, may be activated by external electronics including a power source and a controller (not shown) to increase a temperature of the optically-transmissive core 106. An optical path length of light passing into and through the waveguide segment 102 represented by the arrow 108 is increased as the temperature of the optically-transmissive core 106 is increased. A π phase change in light passing through the waveguide segment 102 may be generated by the increased temperature. When a first source of light subjected to such a π phase change is combined with a second source of light in the output waveguide 144, for example, the combined light output may be reduced from a maximum light transmission to an absence of light transmission. Meanwhile, heat introduced into the waveguide segment 102 by the section heaters 112 may dissipate from the apparatus 100, partly by passing through the thermally-conductive base 126 into the thermally-conductive substrate 120. For example, the discontinuous parts of the thermally-conductive base 126 that are on the waveguide segment 102 may provide an adequate pathway for elimination of heat through the thermally-conductive substrate 120, while reducing an effective volume of the waveguide segment 102 to be heated to change a refractive index of the optically-transmissive core 106. Where, for example, the rib 128 is placed at a location 134 along the path represented by the arrow 108 in alignment with a gap 114, a path length for heat from a section heater 112 into the rib 128 may be longer than where, alternatively (not shown), a section heater 112 is aligned with the gap 114 over the waveguide segment 102. This relatively longer path length for heat may reduce conduction of heat from the section heater 112 into the rib 128. Reducing conduction of heat from the section heater 112 into the rib 128 may reduce a power requirement for operating the apparatus 100, and may shorten a cycle time for the apparatus 100 including both heating and cooling of the waveguide segment 102. As a further example, a second apparatus 100 (not shown) may be laterally integrated with the apparatus 100 shown in FIG. 1 along a direction of the arrow 130. In that case, reducing conduction of heat from a section heater 112 into the rib 128 of the apparatus 100 may reduce a potential for cross-talk interference caused in the second apparatus 100 (not shown) by conduction of heat through the rib 128.

Figure 7:
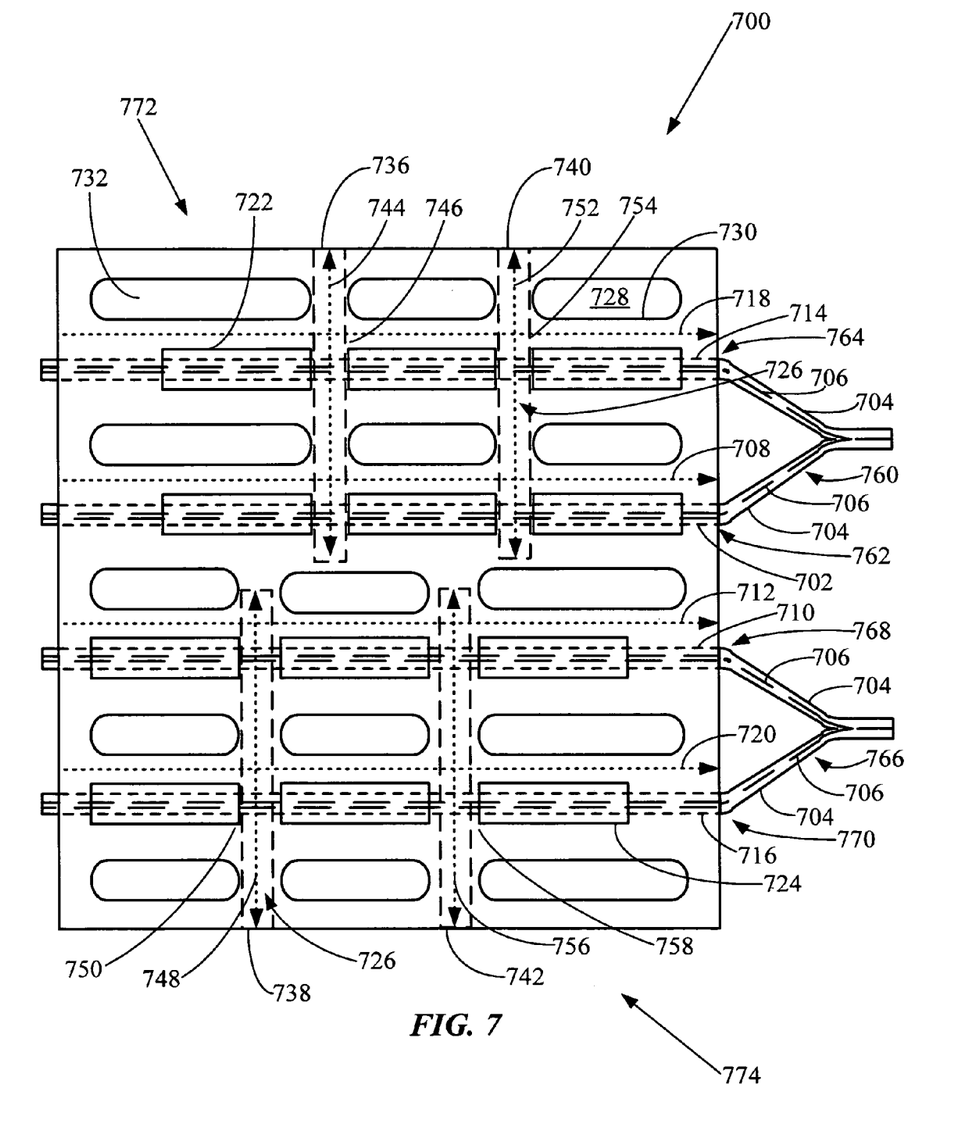
FIG. 7 is a top view showing another example of an apparatus.

FIG. 7 is a top view showing another example of an apparatus 700. It is understood by those skilled in the art that the apparatus 700 is merely an example of an apparatus 100. All of the discussion in this application with respect to the apparatus 100 is applicable to and deemed incorporated into this discussion of the example of an apparatus 700. Likewise, all of the discussion in this application with respect to the apparatus 700 is applicable to and deemed incorporated into the discussion of the example of an apparatus 100. The apparatus 700 includes a first waveguide segment 702 having a cladding 704 that surrounds an optically-transmissive core 706 extending along a first path represented by an arrow 708. The apparatus 700 further includes a second waveguide segment 710 having a cladding 704 that surrounds an optically-transmissive core 706 extending along a second path represented by an arrow 712. The apparatus 700 may, for example, further include third and fourth waveguide segments 714, 716 each having a cladding 704 that surrounds an optically-transmissive core 706, respectively extending along third and fourth paths respectively represented by arrows 718, 720. A heater 722 may be in thermal communication with some or each of the first-fourth waveguide segments 702, 710, 714, 716. As an example, a heater 722 may include a plurality of section heaters 724 spaced apart with interposed gaps 726 along one of the first-fourth paths represented by the arrows 708, 712, 718, 720. Each of the section heaters 724 may be positioned to apply heat to part of a waveguide segment 702, 710, 714, 716 along one of the first-fourth paths represented by the arrows 708, 712, 718, 720.

The apparatus 700 includes a thermally-conductive substrate 728. Cutouts 730 leaving airspace 732 reaching down to the thermally-conductive substrate 728 may laterally separate parts of the waveguide segments 702, 710, 714, 716 along the first-fourth paths represented by the arrows 708, 712, 718, 720. The apparatus 700 further includes a thermally-conductive base (not shown) in fixed alignment with the first-fourth waveguide segments 702, 710, 714, 716 and the thermally-conductive substrate 728. The thermally-conductive base is discontinuously on the first-fourth waveguide segments 702, 710, 714, 716 along the first-fourth paths represented by the arrows 708, 712, 718, 720 respectively, in the same manner as discussed above in connection with the apparatus 100 and illustrated by FIGS. 1-6. The thermally-conductive base may support weight of and structurally immobilize the first-fourth waveguide segments 702, 710, 714, 716 on the thermally-conductive substrate 728.

The apparatus 700 includes a first rib 736 in fixed alignment with the first waveguide segment 702 and the thermally-conductive substrate 728. The apparatus 700 also includes a second rib 738 in fixed alignment with the second waveguide segment 710 and the thermally-conductive substrate 728. The apparatus 700 may, for example, include third and fourth ribs 740, 742 respectively in fixed alignment with the third and fourth waveguide segments 714, 716 respectively and the thermally-conductive substrate 728. The first rib 736 may, for example, transversely extend in the directions of an arrow 744, away from the first waveguide segment 702 at a point 746 along the first path represented by the arrow 708. The second rib 738 may, for example, transversely extend in the directions of an arrow 748, away from the second waveguide segment 710 at a point 750 along the second path represented by the arrow 712. The third rib 740 may, for example, transversely extend in the directions of an arrow 752, away from the third waveguide segment 714 at a point 754 along the third path represented by the arrow 718. The fourth rib 742 may, for example, transversely extend in the directions of an arrow 756, away from the fourth waveguide segment 716 at a point 758 along the fourth path represented by the arrow 720.

The first-fourth ribs 736, 738, 740, 742 may, as an example, be aligned with parts of the thermally-conductive base (not shown) along the first-fourth paths represented by the arrows 708, 712, 718, 720 respectively that are on both the thermally-conductive substrate 728 and the waveguide segments 702, 710, 714, 716, so that the thermally-conductive base and the first-fourth ribs 736-742 may together immobilize and support weight of the first-fourth waveguide segments 702, 710, 714, 716. The first-fourth ribs 736, 738, 740, 742 may, for example, be each aligned with a gap 726. In addition, the apparatus 700 may include a plurality of section heaters 724 interposed between gaps 726. Other aspects of the structural relationships between the thermally-conductive substrate 728, the thermally-conductive base (not shown), the first-fourth waveguide segments 702, 710, 714, 716, and the first-fourth ribs 736, 738, 740, 742, may be selected in the same manners as discussed above with respect to the apparatus 100.

The apparatus 700 may, for example, include an output waveguide 760 in optical communication with an end 762 of the first waveguide segment 702 and an end 764 of the third waveguide segment 714. The apparatus 700 may further, for example, include an output waveguide 766 in optical communication with an end 768 of the second waveguide segment 710 and an end 770 of the fourth waveguide segment 716. For example, the output waveguides 760, 766 may include 2×1 optical couplers.

In an example of operation, an apparatus 700 shown in FIG. 7 including first-fourth waveguide segments 702, 710, 714, 716 and first-fourth ribs 736, 738, 740, 742 may be selected. Section heaters 724 each in thermal communication with one of the waveguide segments 702, 710, 714, 716 and spaced apart by interposed gaps 726, may then be activated by external electronics to increase a temperature of the optically-transmissive core 706. FIG. 7 shows that the first-fourth ribs 736, 738, 740, 742 may, for example, be mutually parallel and spaced apart from each other in the directions of the arrows 744, 748, 752, 756. This spaced-apart arrangement of the first-fourth ribs 736, 738, 740, 742 may increase path lengths for heat from a section heater 724 that is in thermal communication with one of the waveguide segments 702, 710, 714, 716 to the optically-transmissive core 706 of one of the other waveguide segments 702, 710, 714, 716. Where light passing through the first and third waveguide segments 702, 714 is combined in an output waveguide 760 and light passing through the second and fourth waveguide segments 710 and 716 is combined in an output waveguide 766, the apparatus 700 may thus include two separate apparatus 772, 774 for generating a phase change in light. In that case, reducing conduction of heat from a section heater 724 into the ribs 736, 740 of the apparatus 772 may reduce a potential for cross-talk interference caused in the waveguide segments 710, 716 of the apparatus 774. Likewise, reducing conduction of heat from a section heater 724 into the ribs 738, 742 of the apparatus 774 may reduce a potential for cross-talk interference caused in the waveguide segments 702, 714 of the apparatus 772. As a further example, the apparatus 700 may include further apparatus 100, 700 (not shown) in addition to the apparatus 772, 774. The plurality of apparatus 100, 700 integrated into such an apparatus (not shown) may, as examples, include a quantity of apparatus 100, 700 within a range of between 1 and about 100 or about 1,000 or more. In these examples, reducing conduction of heat from the section heaters 724 into the ribs 736, 738, 740, 742 . . . may reduce a power requirement for operating the apparatus, and may shorten a cycle time for the apparatus including both heating and cooling of the waveguide segments 702, 710, 714, 716 . . . . It is understood by those skilled in the art that the ribs 736-742 need not be mutually parallel, and that other relative mutual orientations of two or more ribs 736-742 are contemplated.

Figure 8:
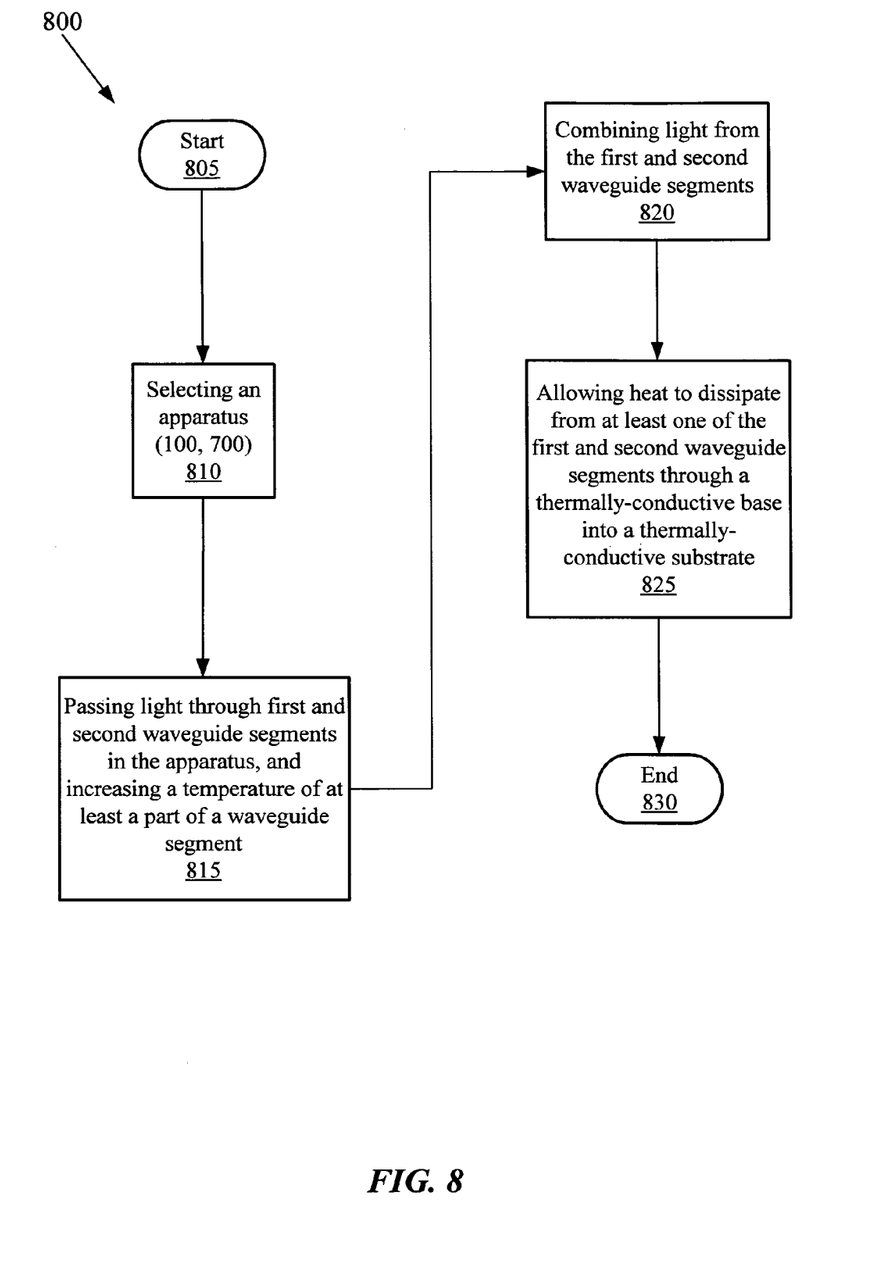
FIG. 8 is a flow chart of an example of an implementation of a process utilizing an apparatus for generating a phase shift in light.

FIG. 8 is a flow chart of an example of an implementation of a process 800 utilizing an apparatus 100, 700 for generating a phase shift in light. The process starts at step 805, and then at step 810 an apparatus 100, 700 is provided including first and second waveguide segments 102, 138, 702, 710, each having a cladding 704 that surrounds an optically-transmissive core 706 extending along a path represented by an arrow 108, 138, 708, 712, the apparatus 100, 700 also including a thermally-conductive substrate 120, 728. A heater 110, 722 is in thermal communication with at least one of the first and second waveguide segments 102, 138, 702, 710 along at least a part of one of the paths represented by an arrow 108, 138, 708, 712. The apparatus 100, 700 further includes a thermally-conductive base 126 in fixed alignment with a waveguide segment 102, 138, 702, 710 and the thermally-conductive substrate 120, 728, the thermally-conductive base 126 discontinuously on a waveguide segment 102, 138, 702, 710 along a path represented by an arrow 108, 138, 708, 712. A rib 128, 736, 738, 740, 742 is in fixed alignment with a waveguide segment 102, 138, 702, 710 and the thermally-conductive substrate 120, 728. The rib 128, 736, 738, 740, 742 transversely extends in a direction away from a waveguide segment 102, 138, 702, 710 at a point 134, 136, 746, 750, 754, 758 along a path represented by an arrow 108, 138, 708, 712. It is understood by those skilled in the art that step 810 may include providing any of the apparatus 100, 700 discussed in this application.

At step 815, light is passed through the first and second waveguide segments 102, 138, 702, 710, and the heater 110, 722 is utilized to increase a temperature of at least a part of at least one of the first and second waveguide segments 102, 138, 702, 710. Light from the first and second waveguide segments 102, 138, 702, 710 is then combined in step 820, causing a phase change in light passing through them at an output waveguide 144, 760, 766. At step 825, heat is allowed to dissipate from at least one of the first and second waveguide segments 102, 138, 702, 710 through the thermally-conductive base 126 into the thermally-conductive substrate 120, 728. The process 800 may then end at step 830.

While the foregoing description refers in some instances to the apparatus 100, 700 as shown in FIGS. 1-7, it is appreciated that the subject matter is not limited to these structures, nor to the structures discussed in the specification. Other shapes and configurations of apparatus may be fabricated that include a heater in thermal communication with a waveguide segment along at least a part of a path of an optically-transmissive core of a waveguide segment, a thermally-conductive base being discontinuously on the waveguide segment along the path, and a rib transversely extending in a direction away from the waveguide segment at a point along the path, the thermally-conductive base and the rib each being in fixed alignment with the waveguide segment and a thermally-conductive substrate. Likewise, the disclosed process 800 may be performed utilizing any such apparatus. Further, it is understood by those skilled in the art that the process 800 may include additional steps and modifications of the indicated steps. The apparatus 100, 700 may be utilized broadly in end-use applications for a thermo-optic phase-shifter. As examples, the apparatus 100, 700 may be utilized in end-use applications for optical switching, optical dimming, and optical tuning. The apparatus 100, 700 may, for example, be utilized as a phase shift interferometer, such as a Mach-Zehnder interferometer. In additional examples, the apparatus 100, 700 may be utilized as a variable optical attenuator multiplexer ("VMUX"), a reconfigurable optical add-drop multiplexer ("ROADM"), an optical cross-connect ("OXC"), an arrayed waveguide grating filter ("AWG"), an optical multiplexer/demultiplexer, or a ring resonator. The apparatus 100, 700 may be utilized, for example, in planar lightwave circuits ("PLCS").

Moreover, it will be understood that the foregoing description of numerous examples has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

What is claimed is:

1. An apparatus, comprising:
    a waveguide segment having a cladding that surrounds an optically-transmissive core and extending along a path;
    two heaters, each heater being in thermal communication with a different portion of the waveguide segment along the path, the heaters being separated by a gap at a location along the path;
    a thermally-conductive substrate;
    a thermally-conductive base in fixed alignment with the waveguide segment and with the thermally-conductive substrate, the thermally-conductive base being discontinuously on the waveguide segment along the path; and
    a rib in fixed alignment with the waveguide segment and with the thermally-conductive substrate, the rib transversely extending in a direction away from a point along the path.

2. The apparatus of claim 1, wherein a part of the rib is interposed between the gap and the thermally-conductive substrate.

3. The apparatus of claim 1, wherein a part of the thermally-conductive base is on the waveguide segment at the location of the gap along the path.

4. A process for generating a phase shift in light, comprising:
    providing an apparatus including:
        a first waveguide segment having a cladding that surrounds an optically-transmissive core and extending along a first path, two heaters respectively being in thermal communication with first and second portions of the first waveguide segment that are separated by a gap on the first waveguide segment at a location along the first path;
        a second waveguide segment having a cladding that surrounds an optically-transmissive core and extending along a second path spaced apart from the first path;
        an output waveguide in optical communication with the first and second waveguide segments;
        a thermally-conductive substrate;
        a thermally-conductive base in fixed alignment with the first and second waveguide segments and with the thermally-conductive substrate, the thermally-conductive base being discontinuously on the first and second waveguide segments along the first and second paths; and
        at least one rib in fixed alignment with the first and second waveguide segments and with the thermally-conductive substrate, the at least one rib transversely extending away from a first point along the first path and away from a second point along the second path;
    passing light through the first and second waveguide segments, and heating the first and second portions of the first waveguide segment to a higher temperature than a temperature of the first waveguide segment at the location;
    combining light from the first and second waveguide segments at the output waveguide; and
    allowing heat to be dissipated from the first waveguide segment through the thermally-conductive base into the thermally-conductive substrate.

5. The process of claim 4, including:
    providing a part of the thermally-conductive base on the at least one rib at the first and second points; and
    allowing heat to be dissipated through the at least one rib into the thermally-conductive substrate.

6. The process of claim 4, including:
    providing a part of the at least one rib interposed between the gap and the thermally-conductive substrate; and
    heating the first and second portions of the first waveguide segment to a higher temperature than a temperature of the part of the at least one rib interposed between the gap and the thermally-conductive substrate.

7. The process of claim 4, including:
    providing a part of the thermally-conductive base on the first waveguide segment at the location of the gap along the path; and
    heating the first and second portions of the first waveguide segment to a higher temperature than a temperature of the part of the thermally-conductive base on the first waveguide segment at the location of the gap along the first path.

8. The apparatus of claim 1, wherein the rib extends for a distance transversely away from the path, and wherein a part of the thermally-conductive base is interposed between the rib and the thermally-conductive substrate and is discontinuously on the rib over the distance.

9. The apparatus of claim 1, wherein the thermally-conductive base includes a post that is on the waveguide segment and is on the thermally-conductive substrate.

10. The apparatus of claim 1 wherein the waveguide segment is a first waveguide segment, and the path is a first path, the apparatus including:
    a second waveguide segment having a cladding that surrounds an optically-transmissive core and extending along a second path different than the first path;
    two heaters, each heater being in thermal communication with a different portion of the second waveguide segment along the second path, the heaters being separated by a gap at a location along the second path;
    the thermally-conductive base being in fixed alignment with the second waveguide segment and with the thermally-conductive substrate, the thermally-conductive base being discontinuously on the second waveguide segment along the second path; and
    a rib in fixed alignment with the second waveguide segment and with the thermally-conductive substrate, the rib transversely extending in a second direction away from a second point along the second path.

11. The apparatus of claim 10, wherein a part of the thermally-conductive base is on the thermally-conductive substrate, on the first waveguide segment at the first point along the first path, and on the second waveguide segment at the second point along the second path.

* * * * *